United States Patent
Thorne

(10) Patent No.: US 9,355,070 B2
(45) Date of Patent: May 31, 2016

(54) SYSTEM AND METHOD OF USING SPATIALLY INDEPENDENT SUBSETS OF DATA TO DETERMINE THE UNCERTAINTY OF SOFT-DATA DEBIASING OF PROPERTY DISTRIBUTIONS FOR SPATIALLY CORRELATED RESERVOIR DATA

(71) Applicant: Julian Thorne, Orange, CA (US)

(72) Inventor: Julian Thorne, Orange, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 791 days.

(21) Appl. No.: 13/678,218

(22) Filed: Nov. 15, 2012

(65) Prior Publication Data

US 2013/0317779 A1    Nov. 28, 2013

Related U.S. Application Data

(60) Provisional application No. 61/560,091, filed on Nov. 15, 2011.

(51) Int. Cl.
  *G06F 17/18* (2006.01)
  *G01V 11/00* (2006.01)
  *G01V 99/00* (2009.01)

(52) U.S. Cl.
  CPC .......... *G06F 17/18* (2013.01); *G01V 11/00* (2013.01); *G01V 99/005* (2013.01); *G01V 2210/6244* (2013.01); *G01V 2210/665* (2013.01); *G01V 2210/667* (2013.01)

(58) Field of Classification Search
  CPC ....... G01V 11/00; G01V 99/005; G06F 17/18
  See application file for complete search history.

(56) References Cited

U.S. PATENT DOCUMENTS

| | | | |
|---|---|---|---|
| 2007/0016389 A1* | 1/2007 | Ozgen | E21B 49/00 703/10 |
| 2008/0125982 A1 | 5/2008 | Yoshihiro et al. | |

(Continued)

OTHER PUBLICATIONS

Deutsch, C.V. and A.G. Journel, GSLIB: Geostatistical Software Library and User's Guide, 2nd Ed. New York: Oxford University Press 1998.

(Continued)

*Primary Examiner* — Elias Desta
(74) *Attorney, Agent, or Firm* — Kamal Goudjil; Marie L. Clapp

(57) ABSTRACT

A system and method, implemented on a computer, for determining the uncertainty of soft-data debiasing of property distributions of spatially correlated reservoir data are provided. The method includes inputting, into the computer, soft-data at a plurality of spatial locations on a grid and hard-data at a plurality of location along well paths that intersect the grid. Each location of the hard-data is collocated with soft-data values of one or more types. The method further includes calculating, using the computer, a variogram of the hard-data and creating subsets of independent hard-data using the variogram and the soft-data values that are collocated with each of the hard-data location; applying, using the computer, a bootstrap process on each of the plurality of subsets of independent hard-data to obtain a plurality of bootstrap data sets from each of the plurality of subsets of independent hard-data; calculating soft-data debiased histograms for each of the obtained plurality of bootstrap data sets using a binary decision tree and the collocated soft-data; and characterizing the uncertainty of the soft-data debiased histograms.

28 Claims, 15 Drawing Sheets

(56) References Cited

U.S. PATENT DOCUMENTS

| | | | |
|---|---|---|---|
| 2008/0144745 A1* | 6/2008 | Hung | H04L 27/261 375/340 |
| 2010/0299126 A1 | 11/2010 | Chugunov et al. | |
| 2011/0015909 A1 | 1/2011 | Zhao | |
| 2012/0221306 A1* | 8/2012 | Hurley | G01V 99/005 703/6 |

OTHER PUBLICATIONS

A.G.Journal, Resampling from stochastic simulations. Environmental and Ecological Statistics, 1994, p. 63-91.

Vejbæk, O.V., and L. Kristensen, 2000, Downflank hydrocarbon potential identified using seismic inversion and geostatistics: Upper Maastrichtian reservoir unit, Dan Field, Danish Central Graben: Petroleum Geoscience, v. 6, p. 1-13.

* cited by examiner

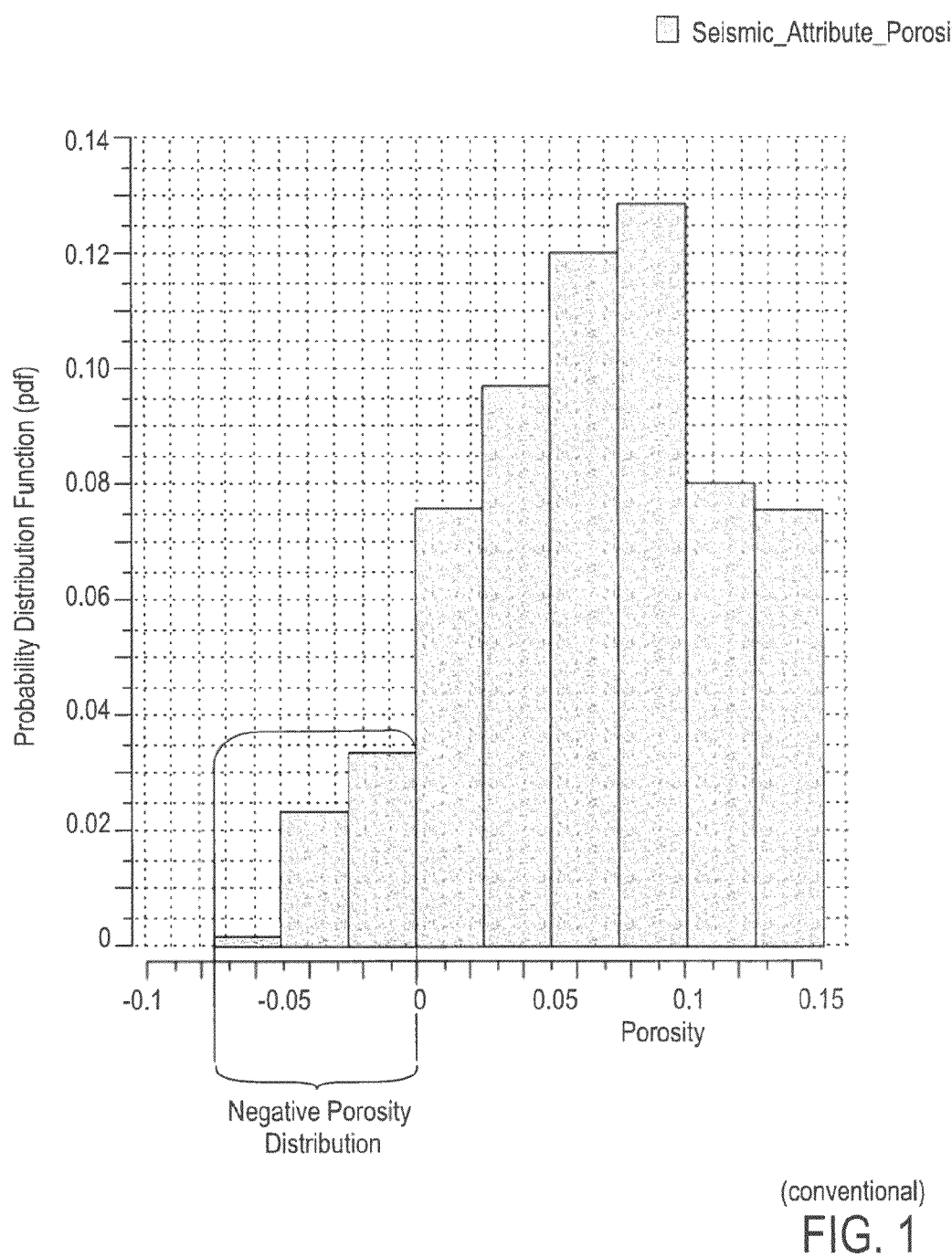
(conventional)
FIG. 1

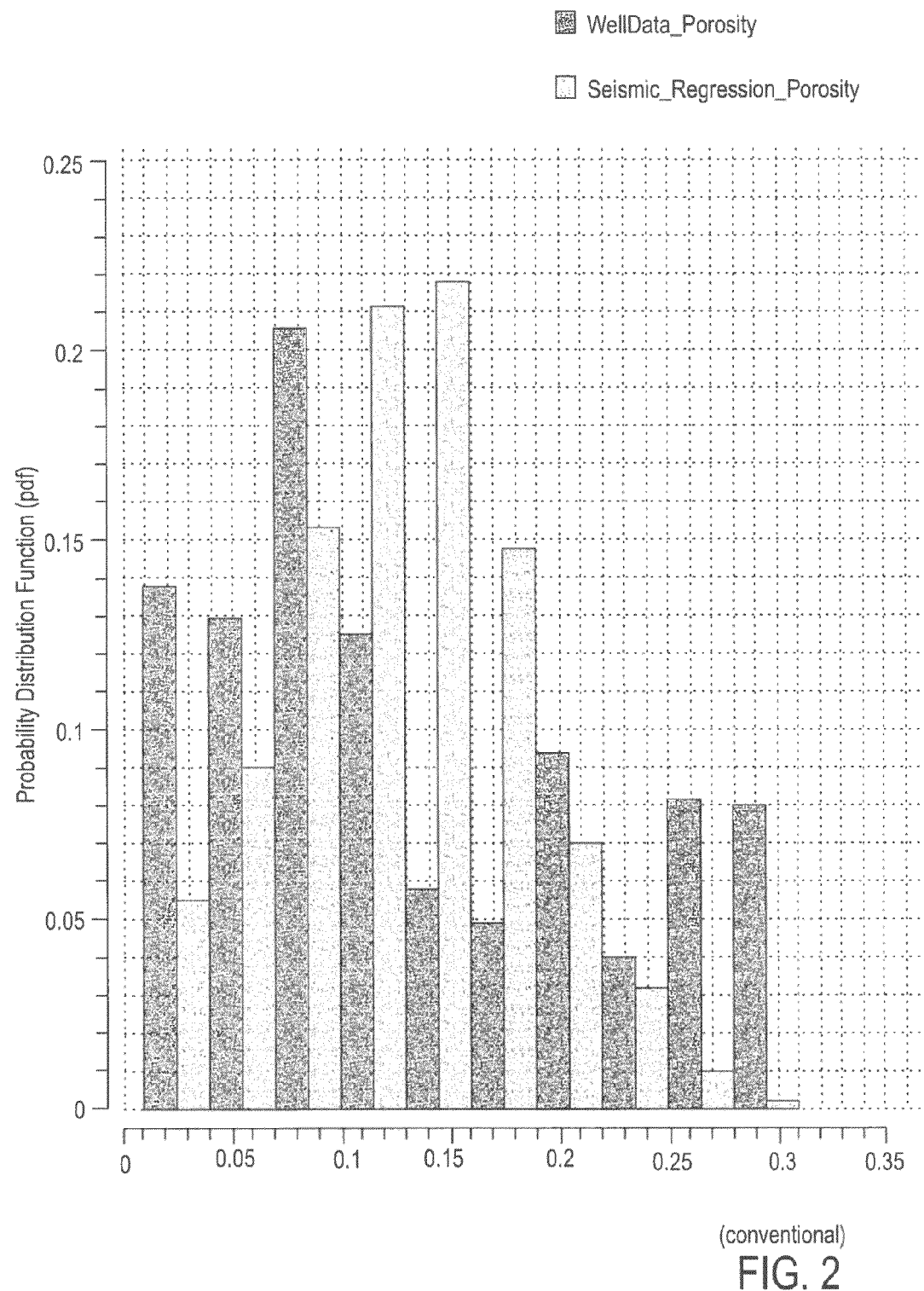
(conventional)
FIG. 2

Distribution minimum [0.0]   Distribution maximum [0.4]

Enter a list of minimum/maximum values: one for each reservoir property selected Number of bootstrap sets per region [100]

Seeds [201]

Statistical sinificance level minimum [90]   Level maximum [95]

○ Mean   ○ Variance   ○ P10   ○ P90   ○ P10 and Mean   ○ P90 and Mean

Ensemble averaging percentage [5]

Bootstrap sets ranked near each other (within the ensemble averaging percent) are averaged together ———— Output ————

Book name [SoftDataDebiasing]

Sheet name prefix [BootstrapStatistics]

Distribution name prefix [Distribution]

Note: Property Name and Ranking Type are automatically added to output distribution names

[OK]   [Apply]   [Cancel]   [Help]

FIG. 12

SYSTEM AND METHOD OF USING SPATIALLY INDEPENDENT SUBSETS OF DATA TO DETERMINE THE UNCERTAINTY OF SOFT-DATA DEBIASING OF PROPERTY DISTRIBUTIONS FOR SPATIALLY CORRELATED RESERVOIR DATA

CROSS-REFERENCE TO RELATED APPLICATIONS

This Application is based upon and claims the benefit of U.S. Provisional Application 61/560,091 filed Nov. 15, 2011 and is related to U.S. Non-Provisional Applications 13/297,092 and 13/297,070, now U.S. Pat No. 9,146,903 both filed on Nov. 15, 2011, the entire contents of each is herein incorporated by reference.

FIELD

The present invention relates generally to statistical analysis of petrophysical data or more specifically to a system and a method of using spatially independent subsets of data to determine the uncertainty of soft-data debiasing of property distributions for spatially correlated reservoir data.

BACKGROUND

Reservoir properties are sampled at well logs (wireline, LWD or cased-hole logs). Proper characterization of a reservoir, particularly for estimates of net rock volume, porosity volume, and original oil in place, requires an estimate of the property distributions of shale volume, porosity, saturation, etc. and the uncertainty of these property distributions. Property distribution uncertainty is a key component of reservoir characterization that affects volumetric uncertainty and reservoir recovery forecasts.

Methods for predicting reservoir properties such as porosity and the shale percentage in a 3D volume from seismic attributes and inversion products have been described in the literature and are widely available from vendors such as Hampson-Russell, Jason Geophysical, or Rock Solid. However, these tools generally suffer from two limitations. A first limitation is that the empirical calibration of the seismic properties to the observed reservoir properties inherently creates an unrealistic reservoir property histogram. For example, FIG. 1 depicts an example of a probability distribution function (PDF) using a conventional method of a field porosity predicted from seismic attributes. As shown in FIG. 1, the PDF obtained using the conventional seismic-porosity method shows negative porosities which is clearly a defect of the conventional method. A second limitation is that the uncertainty of the predicted values in the volume and/or the predicted property histogram is not quantitatively accounted for.

These limitations need to be addressed because quantitative oil in place (OIP) assessment is based on an accurate prediction of field-wide reservoir property histogram, percentage of the histogram above an economic cutoff which may lie at an extremity of the distribution, and the uncertainty of these statistics. For example, the EMERGE product of Hampson-Russell of CGGVeritas which predicts reservoir properties using seismic attributes and well log data, uses step-wise linear regression and Gaussian distribution fitting for seismic-well calibration. Both of these processes, i.e., step-wise linear regression and Gaussian distribution fitting, by their very mathematical nature tend to produce predicted reservoir property histograms that do not capture the shape or extremes of the distribution. FIG. 2 depicts a comparison between a probability distribution function (PDF) of a field porosity obtained by conventional step-wise linear regression and a probability distribution function (PDF) of a field porosity obtained from well data. As shown in FIG. 2, the PDF obtained using the conventional regression method under-represents the porosity below 0.05 or above 0.25 when compared with the porosity obtained from well data.

Geostatistical sequential Gaussian property simulation methods require as input a property histogram to be used to derive the backward and forward transform cumulative distribution function (see, Deutsch, C. V. and A. G. Journel, GSLIB: Geostatistical Software Library and User's Guide, 2nd Ed. New York: Oxford University Press 1998). This requirement can lead geostatistical practitioners to use the property histogram of the hard-data, which is most often a property data at the well locations at which the model will be fitted exactly, as the external histogram constraint. However, the use of hard-data defeats the purpose of using soft-data. Soft-data most often is based on seismic attributes that capture property variations between well control in a modeling process.

One way of addressing this issue was proposed by Deutsch et al. (see, Deutsch, C. V., P. Frykman, and Y. L. Xie, Declustering with Seismic or "soft" Geologic Data, Centre for Computational Geostatistics Report One 1998/1999, University of Alberta). Deutch et al. proposed to decluster the histogram using soft-data which is also known as soft-data debiasing. The process described can be used when there is a good statistical correlation between the hard-data and soft-data (see, Vejbæk, O. V., and L. Kristensen, 2000, Downflank hydrocarbon potential identified using seismic inversion and geostatistics: Upper Maastrichtian reservoir unit, Dan Field, Danish Central Graben: Petroleum Geoscience, v. 6, p. 1-13). Unfortunately, statistical correlation between the hard-data and soft-data does not occur when all of the hard-data and soft-data are examined in one set. As a result, conventional methods do not provide a satisfactory answer.

Therefore, there is a need for a system and a method of using spatially independent subsets of data to determine the uncertainty of soft-data debiasing of property distributions for spatially correlated reservoir data.

SUMMARY

In accordance with some aspects of the disclosure is provided a method, implemented on a computer, for determining the uncertainty of soft-data debiasing of property distributions of spatially correlated reservoir data. The method includes inputting, into the computer, soft-data at a plurality of spatial locations on a grid and hard-data at a plurality of location along well paths that intersect the grid. Each location of the hard-data is collocated with soft-data values of one or more types. The method further includes calculating, using the computer, a variogram of the hard-data and creating subsets of independent hard-data using the variogram and the soft-data values that are collocated with each of the hard-data location; applying, using the computer, a bootstrap process on each of the plurality of subsets of independent hard-data to obtain a plurality of bootstrap data sets from each of the plurality of subsets of independent hard-data; calculating soft-data debiased histograms for each of the obtained plurality of bootstrap data sets using a binary decision tree and the collocated soft-data; and characterizing the uncertainty of the soft-data debiased histograms.

In accordance with other aspects of the disclosure is provided a computer system for determining the uncertainty of soft-data debiasing of property distributions of spatially correlated reservoir data. The computer system includes a storage device configured to store soft-data at a plurality of spatial locations on a grid and hard-data along well paths that intersect the grid. The system further includes a processor configured to output a graphical user interface, the graphical user interface comprising a plurality of fields for inputting parameters. The processor is configured to calculate a variogram of the hard-data and creating subsets of independent hard-data using a variogram; apply a bootstrap process on each of the plurality of subsets of independent hard-data to obtain a plurality of bootstrap data sets from each of the plurality of subsets of independent hard-data; calculate soft-data debiased histograms for each of the obtained plurality of bootstrap data sets using a binary decision tree; and characterize the uncertainty of the soft-data debiased histograms.

In accordance with yet other aspects of the disclosure is provided a method, implemented on a computer, for calculating soft-data debiased histograms of hard-data. The method includes receiving, by the computer, a dataset at a plurality of depths of soft-data at a large number of spatial locations in a grid and hard-data along well paths that intersect the grid; selecting a confidence level; creating weighted soft-data values from a linear combination of soft-data values that maximizes the correlation with a linear combination of collocated hard-data values; sorting, using the computer, all data by weighted soft-data value and putting all the data in one bin; determining, using the computer, a first split weighted soft-data value that maximizes a difference in hard-data property values in the bin above the first soft-data split value and below the first soft-data split value; if the difference in hard-data property values is statistically significant at the selected confidence level accept the first split soft-data value; determining a second split soft-data value for a first sub-bin above the first split soft-data value that maximizes a difference in hard-data property values in a sub-bin within the first sub-bin above the second split soft-data value and below the second split soft-data value; determining a third split soft-data value for a second sub-bin below the first split soft-data value that maximizes a difference in property values in a sub-bin within the second sub-bin above the third split soft-data value and below the third split soft-data value; and repeating the determining recursively until reaching the selected confidence level to form a binary tree decision tree of classification of bins.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 depicts an example of a probability distribution function (PDF) using a conventional method of a field porosity predicted from seismic attributes;

FIG. 2 depicts a comparison between a probability distribution function (PDF) of a field porosity obtained by conventional step-wise linear regression and a probability distribution function (PDF) of a field porosity obtained from well data;

FIG. 12 depicts another graphical user interface (GUI) for inputting various parameters such as a number N of sets per region to calculate a statistical distribution, according to an embodiment of the present invention.

DETAILED DESCRIPTION

According to an aspect of the present disclosure, it is provided a system and a method of using spatially independent subsets of data to determine the uncertainty of soft-data debiasing of property distributions for spatially correlated reservoir data. In one embodiment, reservoir data may include geological, geophysical, and petrophysical data. In one embodiment, data is subset into groups or clusters in which the soft-data distribution is significantly statistically different. Moreover, if a method of spatial bootstrap using independent samples is employed, the uncertainty of the soft-data to hard-data calibration can also be determined.

Figure 3A:
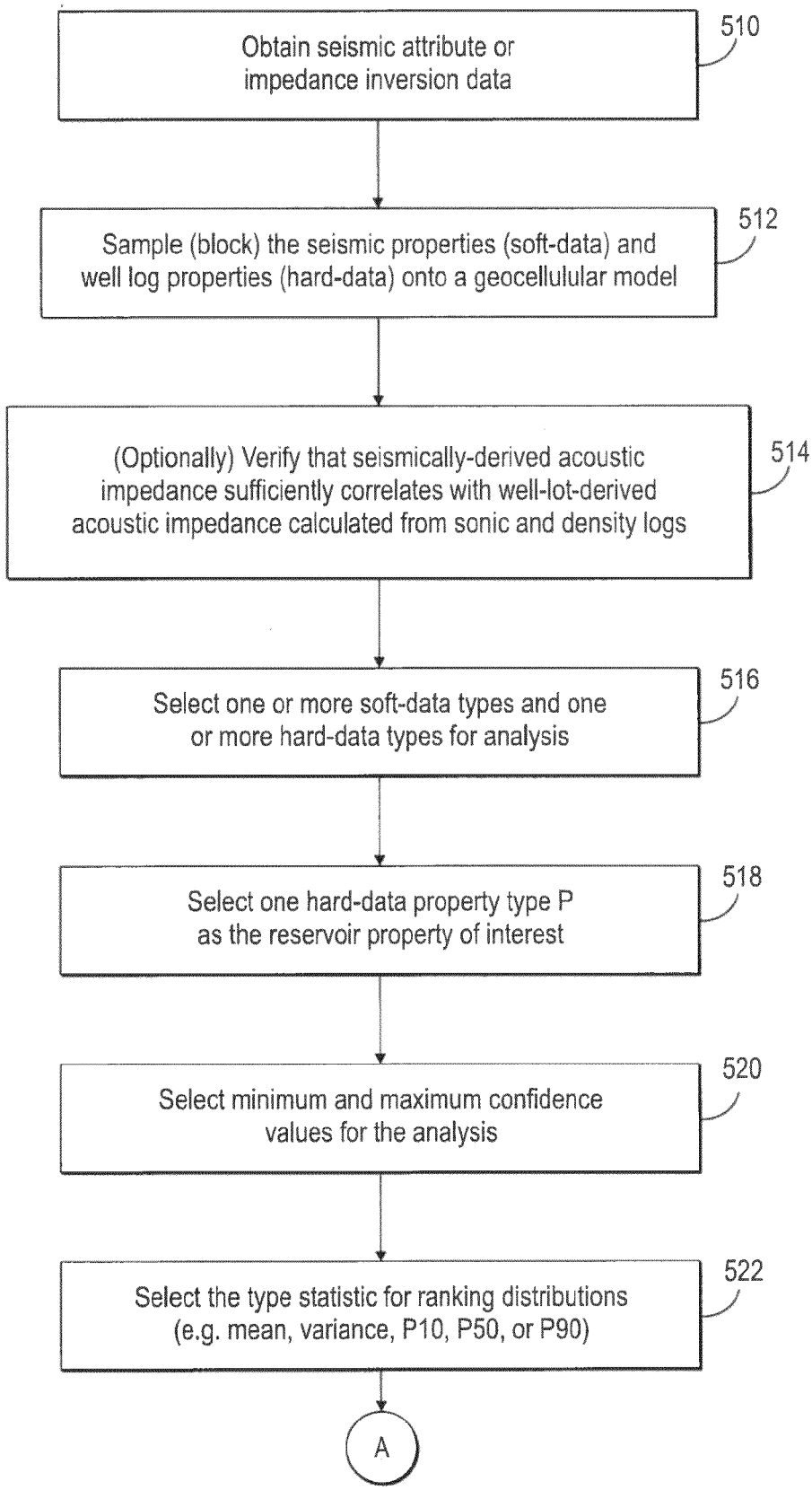
FIGS. 3A and 3B show flow charts of a method of using spatially independent subsets of data to determine the uncertainty of soft-data debiasing of property distributions for spatially correlated reservoir data, according to an embodiment of the present invention.
Figure 3B:
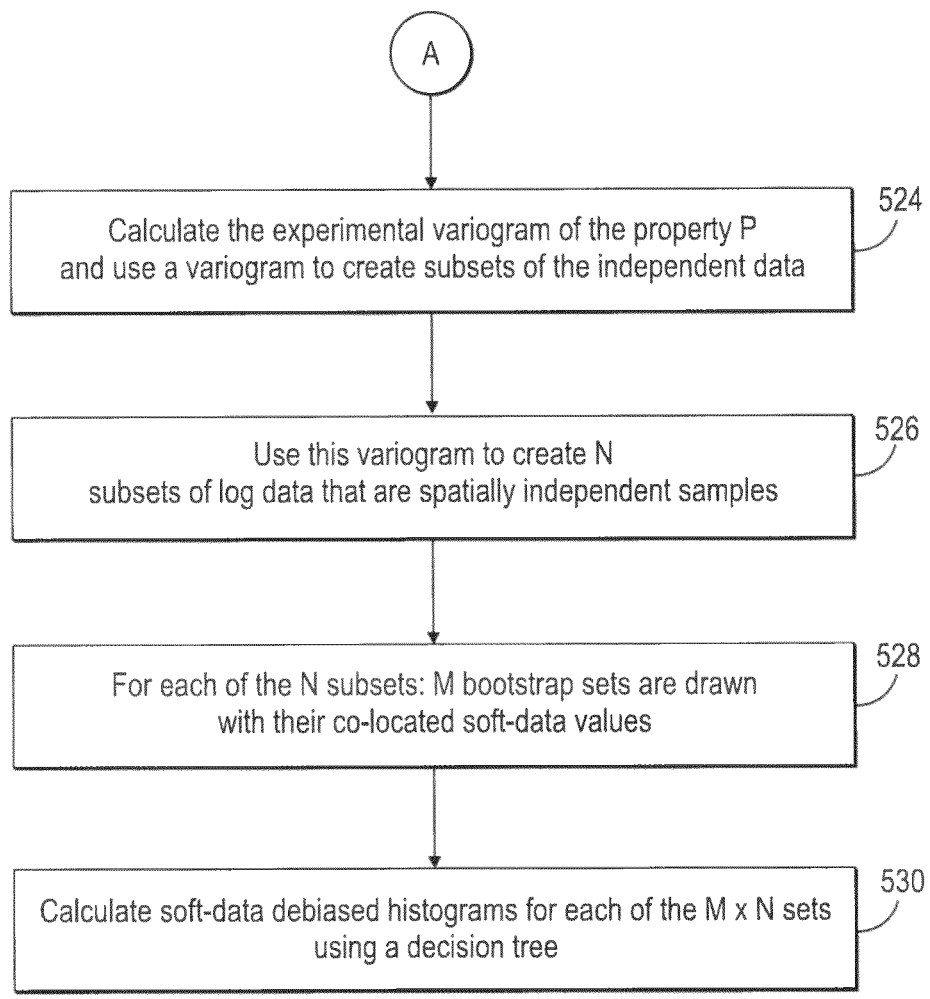

FIGS. 3A and 3B show flow charts of a method of using spatially independent subsets of data to determine the uncertainty of soft-data debiasing of property distributions for spatially correlated reservoir data, according to an embodiment of the present invention. As depicted in FIG. 3A, the method includes obtaining seismic attribute (e.g. impedance inversion data) co-located with well log data (e.g., well impedance data) within the property modeling volume, at S10. The method further includes sampling the seismic properties (i.e., soft-data) and well log properties (i.e., hard-data) onto a geo-cellular model, at S12. The method further includes optionally verifying that the seismic attributes such as seismically-derived acoustic impedance sufficiently correlates well log properties such as well-log-derived acoustic impedance calculated from sonic and density logs, at S14. The method further includes selecting one or more soft-data types and one or more hard-data types for analysis, at S16.

The method further includes selecting one hard-data property type P as the reservoir property of interest, at S18. The method also include selecting a minimum and maximum confidence levels, at S20, and selecting the type of ranking statistic for ranking the distributions (e.g., mean, variance, P10, P50, P90, etc.), at S22.

As depicted in FIG. 3B, the method further includes calculating an experimental variogram of the selected property P and use the variogram to create subsets of independent hard-data, at S24. The variogram is used to create N subsets of log data that are spatially independent samples, at S26. For each of the N subsets, M bootstrap sets are drawn with their co-located soft-data values, at S28.

A variogram in a two-dimensional space is generally noted $2\gamma(\delta x,\delta y)$, where $\gamma(\delta x,\delta y)$ is called the semi-variogram. The variogram is a function describing the degree of spatial dependence as a function of separation $(\delta x,\delta y)$ between two points of a spatial random field or stochastic process $Z(x,y)$. The variogram is used, at S26, to create N subsets of log data that are substantially independent. N subsets (where N is greater than 2) are needed so as to achieve a statistically meaningful result.

A variogram can be generated from many sources. For example, a variogram can be generated by analyzing the original sample log data and analyzing the correlation of the sample data as a function of distance $(\delta x,\delta y)$. The variogram can also be generated from conceptual models. In the present case, however, the variogram is generated by analyzing the original sample data correlation with space or distance. However, as it can be appreciated other methods for generating a variogram can also be used. For example, when the sample data are relatively close they are considered to be dependent but as distance increases the dependency or correlation in the sample data decreases. In other words, the distance is scaled by a variogram. Variogram distance in one direction may not be equivalent to variogram distance in another direction. In this respect, variograms are ellipsoids in that the variation of the variogram along the east-west direction is different from the variation of the variogram along the north-south direction.

Variograms have a gamma value also called covariance. The gamma value varies from zero to one, when using normal scores. When using a normal score transform such as, for example, the standard deviation, the gamma value is equal to one when normalized by the standard deviation. Hence, it is generally assumed that if gamma values are greater than one then the sample data is considered to be independent. On the other hand, if gamma values are less than one then the sample data is dependent or correlated. The closer the gamma value to zero, the more the sample data is dependent or correlated.

The gamma value threshold can be selected by a user according to the sample data. If the sample log data is highly correlated, for example, then selecting a gamma value threshold greater than one would eliminate a great number of data points which would render a bootstrap process on the sample data not useful. On the other hand selecting a gamma value threshold close to zero would leave most the correlated sample data which would also render a bootstrap operation on correlated sample data less useful. Therefore, the gamma value threshold is selected to achieve a compromise so as not to filter out most of the sample data but at the same time select sample data that is not highly correlated so as to obtain a meaningful bootstrap result. Therefore, the gamma value can be selected from the range between zero and approximately one. However, in order to achieve a good compromise, a gamma value between about 0.3 to about 1 can be selected. In the present example, a gamma value of approximately 0.5 is selected as the threshold. Hence, sample data that have a gamma value of less than approximately 0.5 is filtered out while sample data having a gamma value greater than approximately 0.5 (e.g., between approximately 0.5 and 1.0) is used.

As further illustrated in FIG. 3B, the method further includes calculating soft-data de-biased histograms for each of the M×N sets using a decision tree by randomly selecting a confidence level between the minimum and the maximum values above, at S30.

Figure 4:
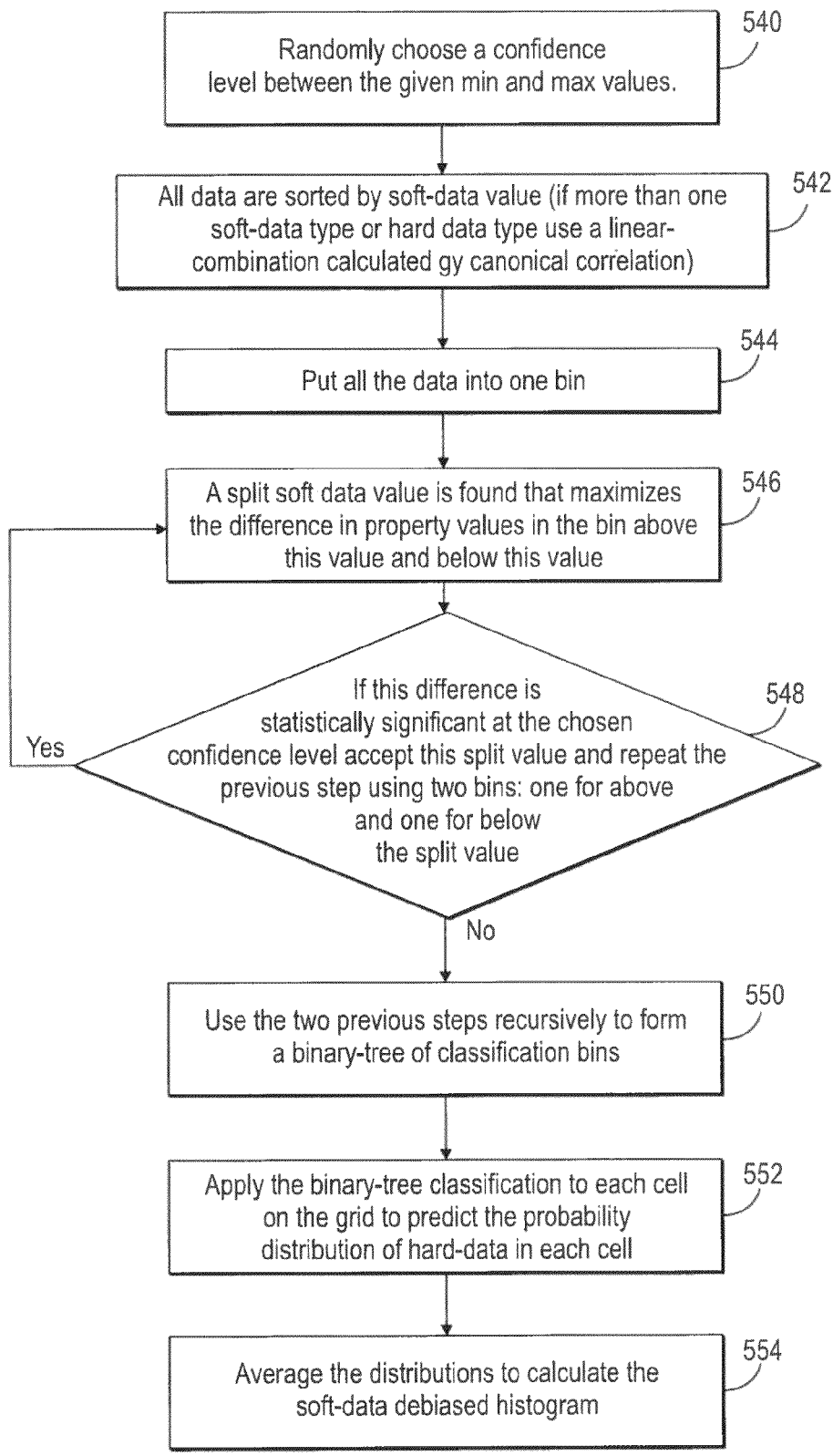
FIG. 4 depicts a flow chart for calculating debiased histograms for each of M×N data subsets, according to an embodiment of the present invention.

According to an embodiment the present invention, the debiased histograms are calculated for each of the M×N sets using the method depicted in FIG. 4. FIG. 4 depicts a flow chart for calculating debiased histograms for each of the M×N sets, according to an embodiment of the present invention. The method includes randomly selecting a confidence level CL between the given minimum and maximum values of confidence (MinCL<CL<MaxCL), for example within the range of 85% and 95%, such as 90%, at S40. The method further includes, sorting all data by soft-data value, at S42. In one embodiment, if more than one soft-data type or hard-data type a linear-combination of the soft-data or the hard-data calculated by canonical correlation can be employed. The method further includes putting all the data in a one bin, at S44. The method then determines or finds a split soft-data value SP1 that maximizes a difference $\Delta V$ in property values in the bin above this split value SP1 and below this split value SP1, at S46. If this difference $\Delta V$ is statistically significant at the chosen confidence level CL accept this split value SP1, repeat step S48 using two bins: one for above the split value SP1 and one for below the split value SP. In other words, for the bin above split value SP1, determine another split value SP2 within this bin that maximizes a difference in property values in the sub-bin above this split value SP2 and below this split value SP2. Similarly, for the bin below split value SP1, determine another split value SP3 within this bin that maximizes a difference in property values in the sub-bin above this split value SP3 and below this split value SP3. This process can be repeated a plurality of times, recursively to form a binary-tree of classification bins, at S50. When there exists no split value in a bin that is statistically significant then that bin is left unsplit and no recursive call is made to step S46.

In step S46, any statistical method capable of determining if two set of data have significantly different means can be used as long as it is corrected for small sample sizes. For example, an embodiment might use the Mann-Whitney U test, which is known to those skilled in the art.

Figure 5:
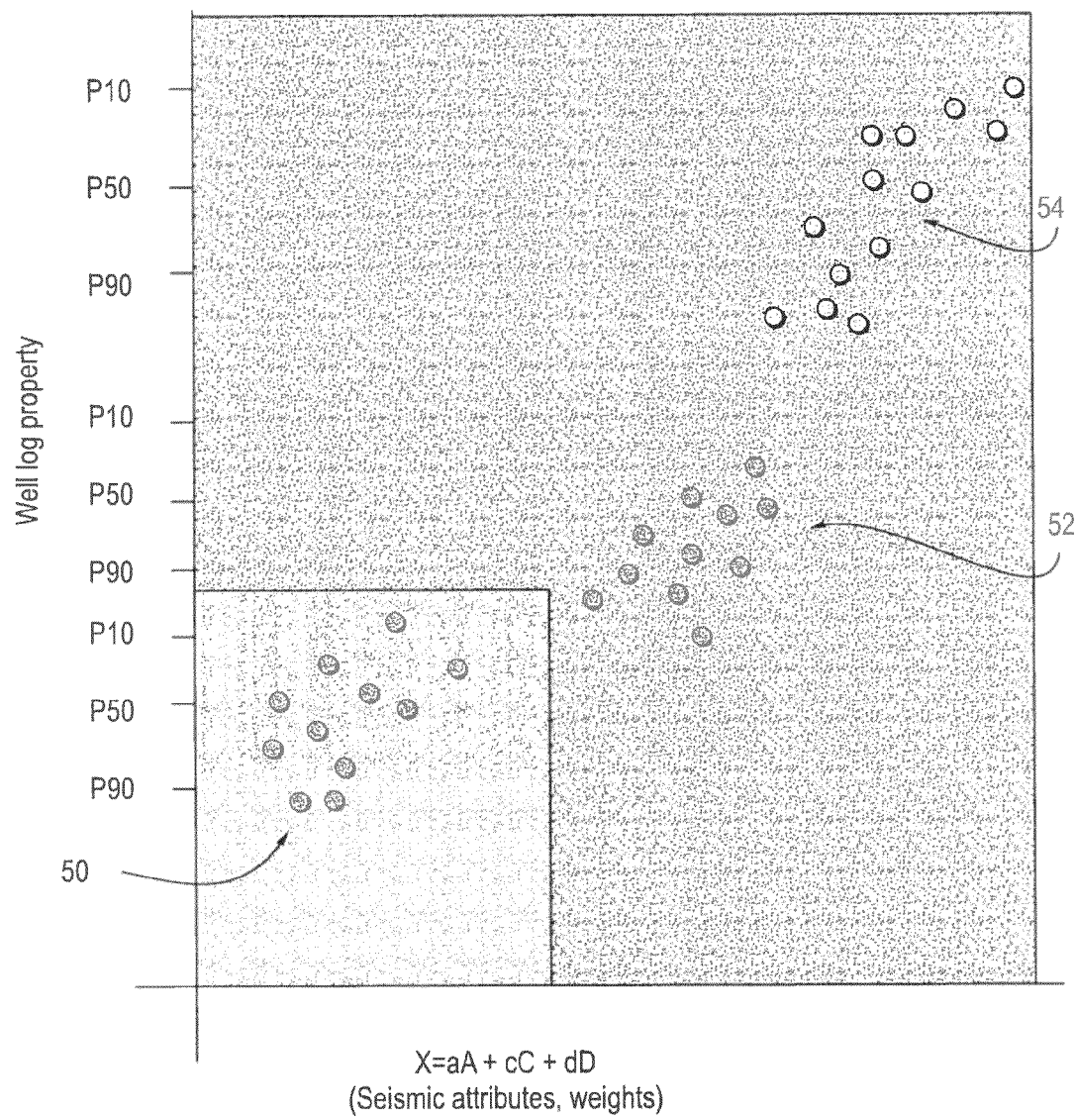
FIG. 5 shows a plot of a statistical distribution of a well log property (Y-axis) as a function of weighted seismic attributes (X-axis), according to an embodiment of the present invention.

FIG. 5 shows a plot of a statistical distribution of a well log property (Y-axis) as a function of weighted seismic attributes (X-axis), according to an embodiment of the present invention. For example, the seismic attributes can be A, B, C and D and each seismic attribute is weighted by a factor a, b, c and d, respectively. That is X=aA+bB+cC+dD. A seismic attribute can be, for example, an impedance product or any other type of seismic attribute. In this example, the well log property (Y-axis) represents a single well log property. However, the Y-axis may also represent a combination of a plurality of well log properties.

In one embodiment, the method includes adjusting the weights a, b, c and d to maximize a straight relationship between a group of well log property and weighted seismic attributes. The weights a, b, c and d can be adjusted so that the relationship between the well log property and the weighted seismic attributes is more linear so as to cluster or group linear data together. In order to cluster data, a straight line relationship is maximized between the combination of seismic attributes and the well log property distribution so as to obtain clustered data that has a linear relationship. For example, as shown in FIG. 5, the data is clustered or split into three data portions or groups 50, 52 and 54 so that the data 50, 52 and 54 exhibits a more linear relationship. Although the data is shown split into 3 groups or portions, the data may be further divided and clustered in an increased number of groups so as to maximize the linear relationship.

A split soft data value is determined that maximizes the difference in property values in the bin above the value and below the value.

If the difference is statistically significant at a chosen confidence level, the split value is accepted and return to the previous step one using two bins, one for the above the split value and one for the below the split value. Each group or cluster has a different well log property distribution.

The binary classification process to split into groups is followed until reaching a confidence level. The splitting is performed to obtain as many groups as possible without dropping below a certain confidence level. If the splitting leads to the data dropping below the set confidence level, the splitting stops. Then for each group of soft-data, a distribution of the properties in each group can be analyzed or determined. The confidence level can be selected for example according the confidence a user can give a seismic data. For example, the confidence level can be selected in the range between 85% and 95%, for example 90%.

Figure 6A:
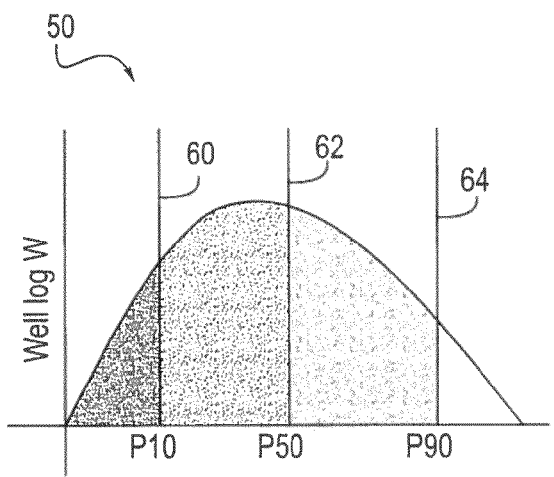
FIGS. 6A-6C show various distributions of Well log data (e.g., porosity) as a function of percentile value for each of obtained split groups from a splitting process, according to an embodiment of the present invention.
Figure 6B:
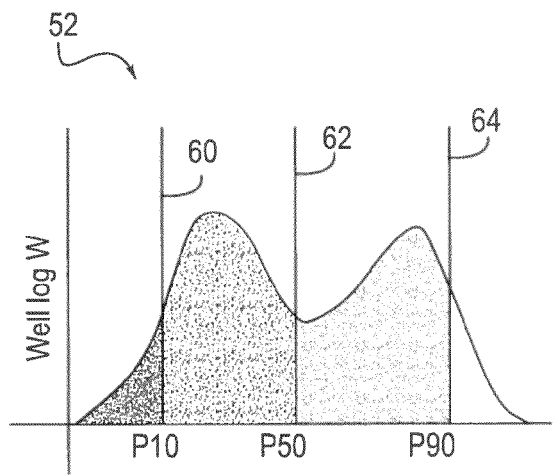
Figure 6C:
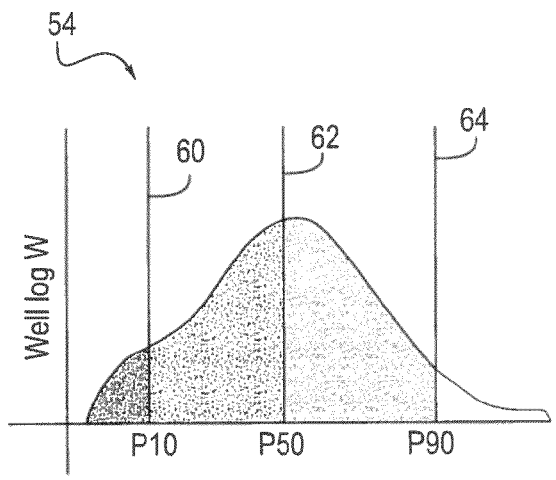

FIGS. 6A-6C show various distributions of well log data W (e.g., porosity) as a function of percentile value for each of the obtained groups 50, 52 and 54 from the splitting process, according to an embodiment of the present invention. Three lines 60, 62 and 64 are drawn on the distributions to indicate the three threshold percentile values P10 (10%), P50 (50%) and P90 (90%), respectively, for ranking the distributions. For each group a cumulative distribution function is obtained by sorting the data and determining the percentiles of each data point in that population.

Figure 7:
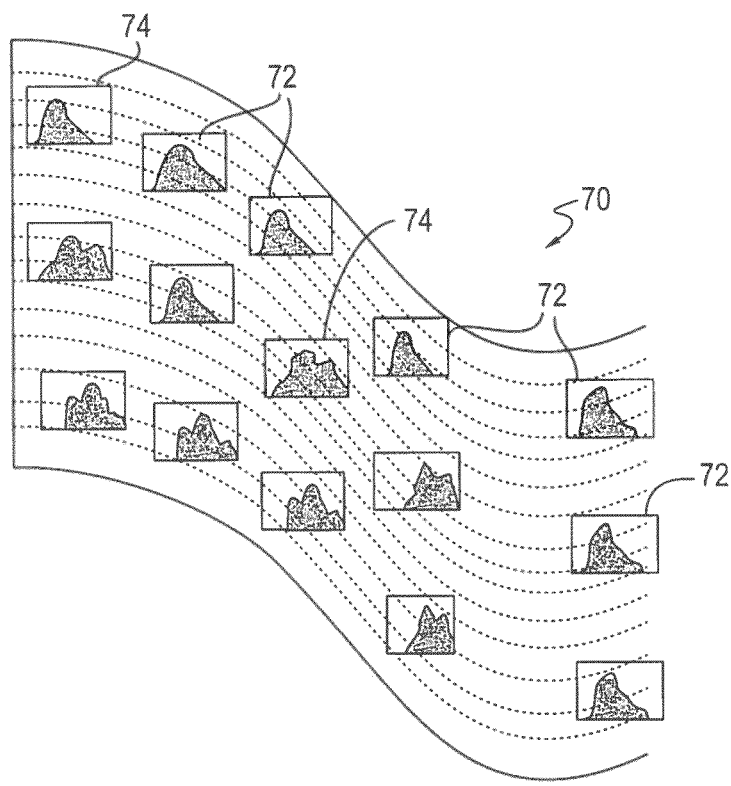
FIG. 7 shows a location of a plurality of cells in a stratigraphic grid within a volume of interest, each cell being assigned seismic soft-data attributes, according to an embodiment of the present invention.

FIG. 7 shows a location of a plurality of cells in a stratigraphic grid 70 within a volume of interest, each cell 72 being assigned seismic soft-data attributes, according to one embodiment. Every cell location is associated with well log distribution 74. Using a weighted combination, an X-value position can be determined, i.e., where each cell 72 within the grid 70 would fall on the X-axis from the weighted combination of attributes (e.g., band-limited impedances).

Figure 8:
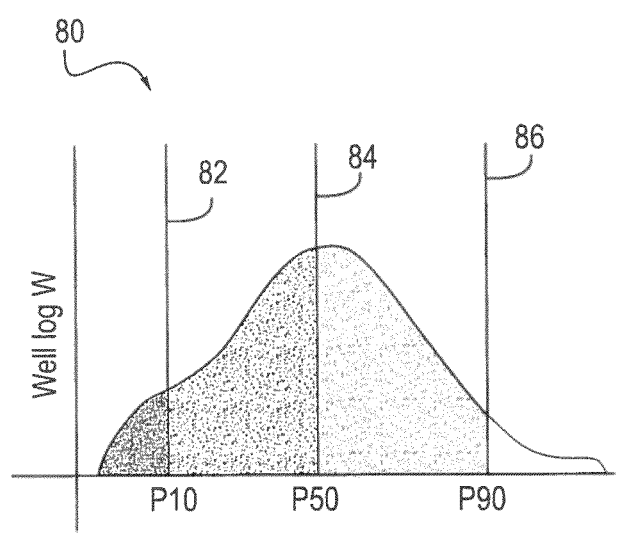
FIG. 8 shows an example of a debiased histogram of an average of all weighted cells shown in FIG. 7, according to an embodiment of the present invention.

By applying the binary-tree classification to each cell 72 on the grid 70 the probability distribution of hard-data in each cell can be predicted. The soft-data debiased histogram is calculated as a cell volume-weighted average of the probability distributions in each cell. For example, if one cell is three times larger than another cell, then, in terms of this volume, the larger cell gets three times the weight. FIG. 8 shows an example of a debiased histogram 80 of an average of all volume-weighted cells 72, according to an embodiment of the present invention. In the histogram 80, the X-axis represents the percentile value of the distribution and the Y-axis represents well log property. Three lines 82, 84 and 86 are drawn in the histogram to indicate, respectively, the P10 percentile value, the P50 percentile value, and the P90 percentile value.

Figure 9A:
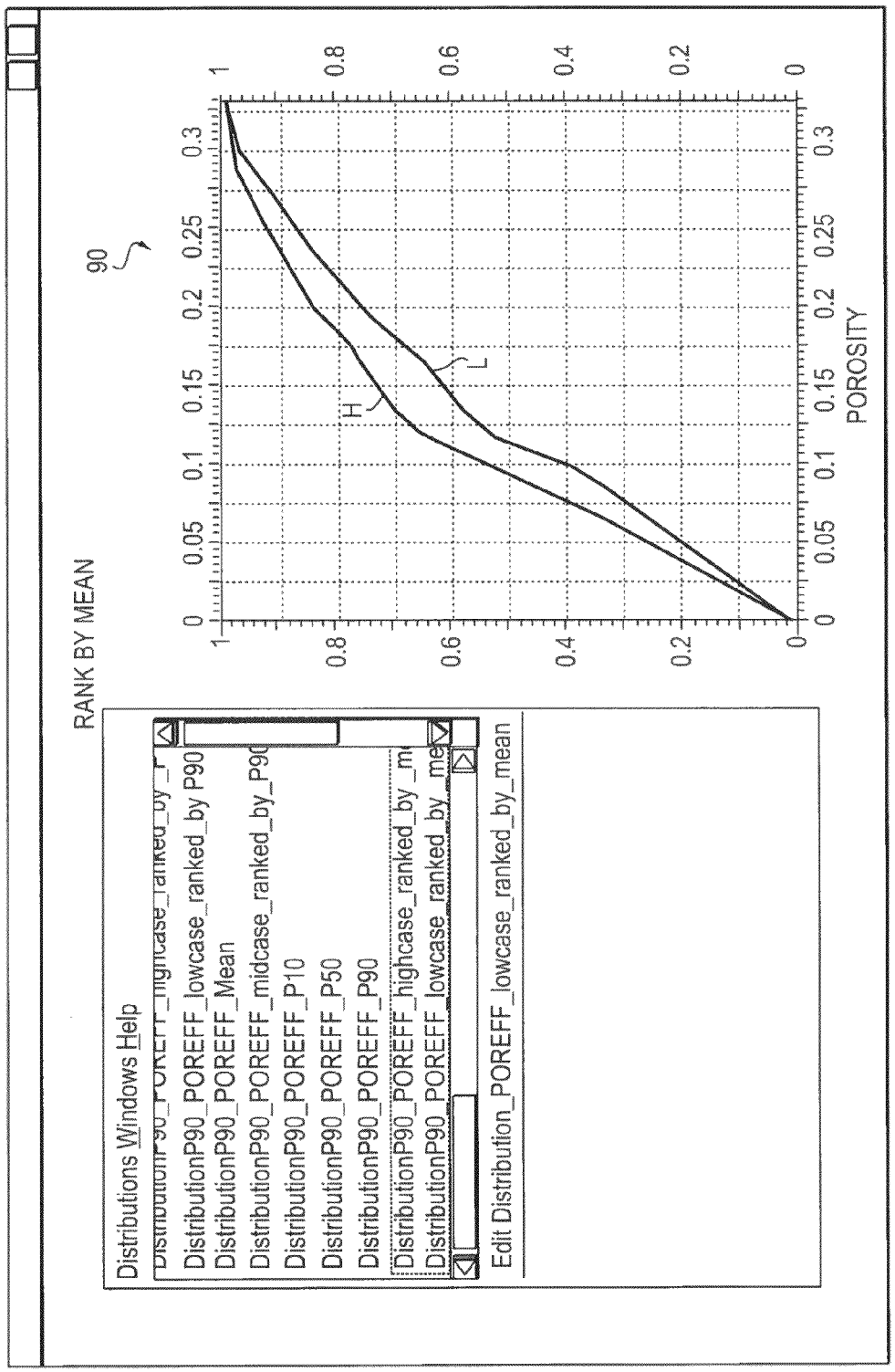
FIGS. 9A and 9B show examples of a graphical interface for displaying the distribution ranked by mean and ranked by percentile value, respectively, according to an embodiment of the present invention.
Figure 9B:
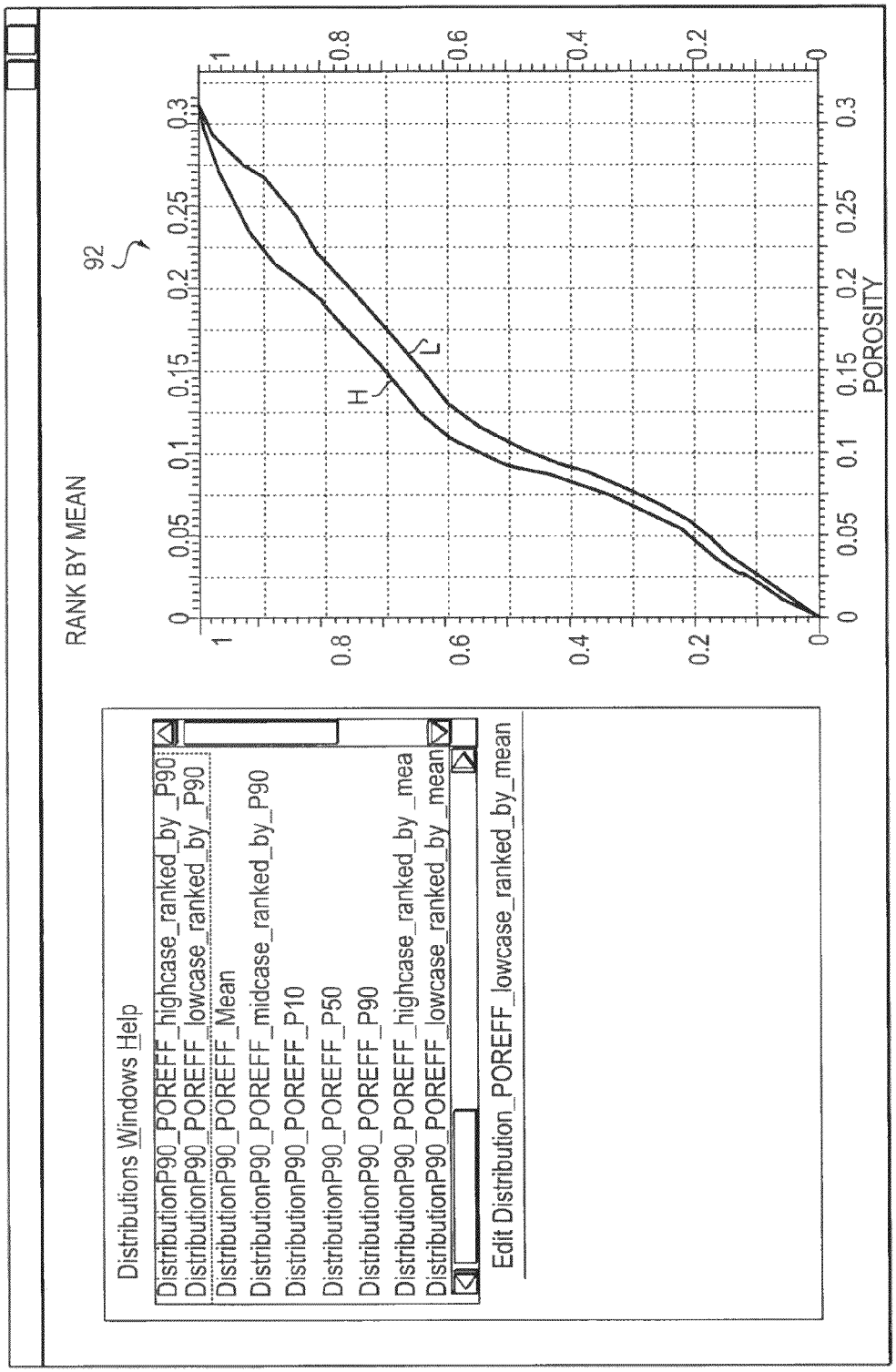

FIGS. 9A and 9B show examples of a graphical interface for displaying the distribution 90 ranked by mean and the distribution 92 ranked by percentile value (in this case P90), respectively, according to an embodiment of the present invention.

As stated above, there are a plurality of different data subsets. Because we have different subsets of data and different bootstrap sampling of that data, the split groups that are obtained and the split points that are selected and the final distributions in each of the bins can be different because starting with a different set of data. As a result, not just one answer is obtained for the final histogram but many answers are obtained for the final histogram. Hence, a selection is made on the obtained histograms as to which histogram represents a P10, a P50 or P90 case. In order to make the selection, the histograms are ranked. In order to rank a whole distribution or the obtained histograms, each obtained histogram (i.e., vector) is converted to a single scalar value.

There are various procedures for ranking histograms or vectors. For example, the vectors can be ranked by using a vector-scalar transform function. Therefore, the ranking procedure includes inputting a selected vector-scalar transform function. The vector-scalar function takes a vector as an input and outputs a scalar value of the vector. Examples of vector-scalar transforms include calculating the P10 of the distribution, the P50 of the distribution, the P90 of the distribution, the mean of the distribution, or the standard deviation of the distribution, etc., or any combination of two or more thereof. Applying the vector-scalar transform on the distributions to obtain a scalar value for each distribution. By using the obtained scalar value from the vector-scalar transform, the distributions or vectors can be sorted into a list of scalar values each of which is associated with the distribution or histogram from which it was calculated. The scalar values are then ranked, for example, in ascending or descending order. For example, if the vector-scalar transform is the mean function, then the distributions can be ranked from low mean to high mean. Standard deviation is another vector-scalar transform that can be used to rank the histograms.

In FIG. 9A, the distribution 90 is ranked using the mean ranking function. In FIG. 9B, the distribution 92 is ranked using the P90 percentile. The X-axis in FIGS. 9A and 9B corresponds the hard-data type such as porosity. Therefore, as shown in FIG. 9A, the value of the distribution is plotted as a function of porosity for a high case 'H' and a low case 'L'. The L and H reservoir property distributions can be used to build three different model scenarios to capture property uncertainty.

Figure 10:
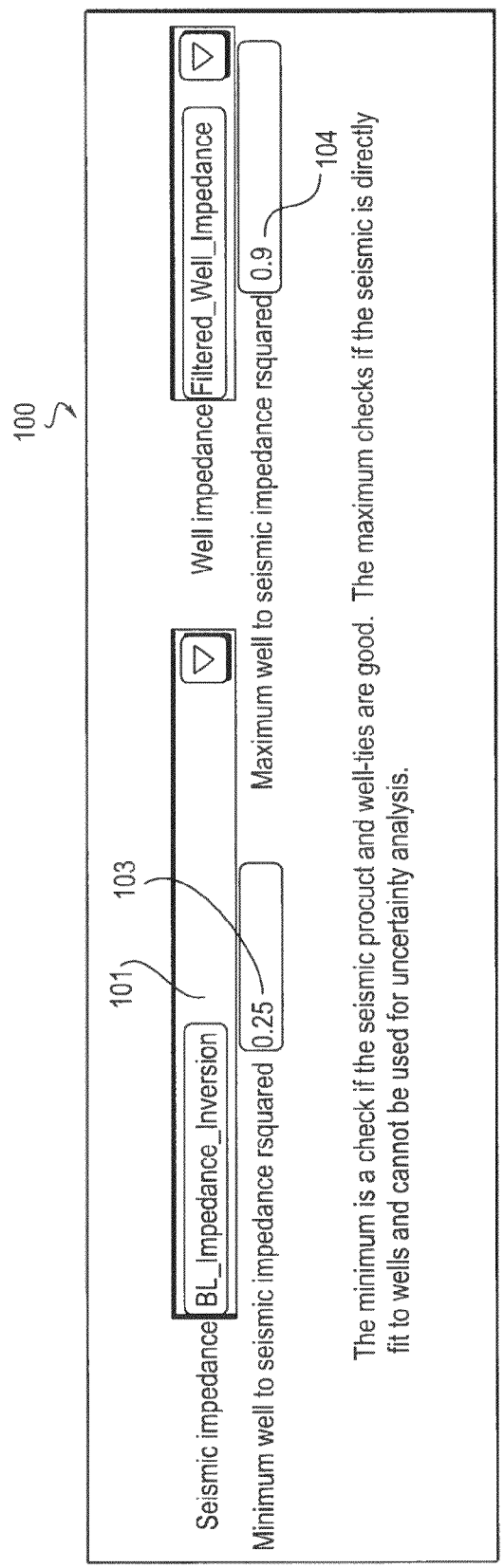
FIG. 10 shows an example of a graphical user interface (GUI) for inputting soft-data and hard-data and evaluating the relationship between the soft-data and the hard-data to check if the soft-data is useable in a debiasing process, according to an embodiment of the present invention.

FIG. 10 shows an example of a graphical user interface (GUI) for inputting soft-data such as, for example, seismic impedance and hard-data such as, for example, well impedance and evaluating the relationship between the soft-data and the hard-data to check if the soft-data is useable in a debiasing process as described in the above paragraphs. GUI 100 includes field 101 for inputting a seismic impedance file and field 102 for inputting a well impedance file. GUI 100 further includes field 103 for inputting a minimum well to seismic impedance coefficient $R^2$ of a linear regression, which can be a value between 0 and 1, for example, 0.25. GUI 100 further includes field 104 for inputting a maximum well to seismic impedance coefficient $R^2$ of the linear regression, which can be a value between 0 and 1, for example 0.9.

Figure 11A:
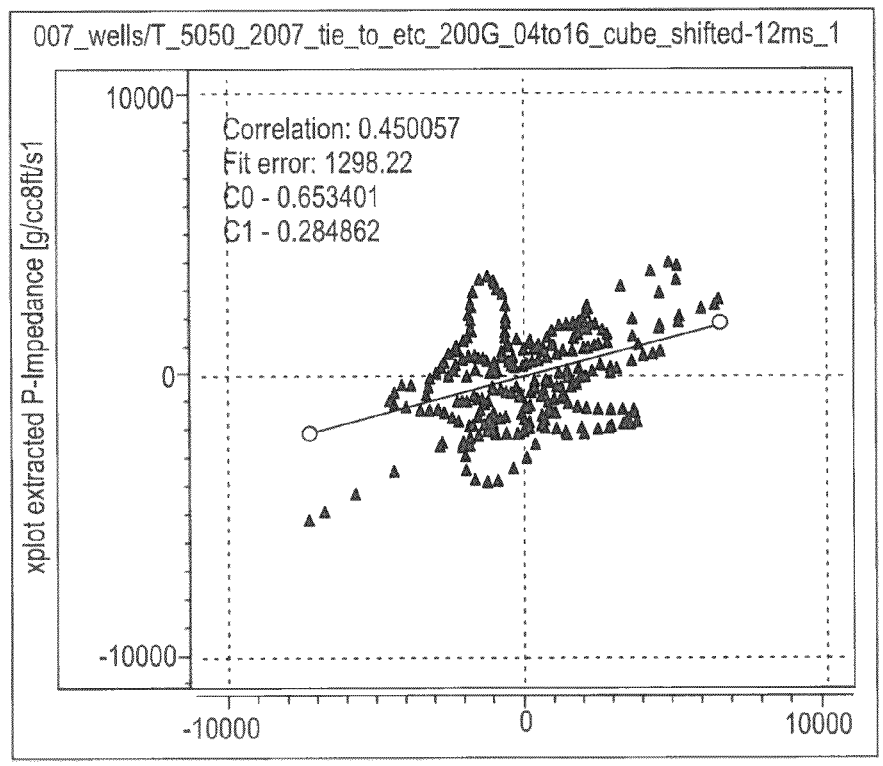
FIGS. 11A to 11D show various output plots of seismic impedance versus well impedance, according to various scenarios of a correlation of seismic impedance with well impedance in the linear regression, according to an embodiment of the present invention.
Figure 11B:
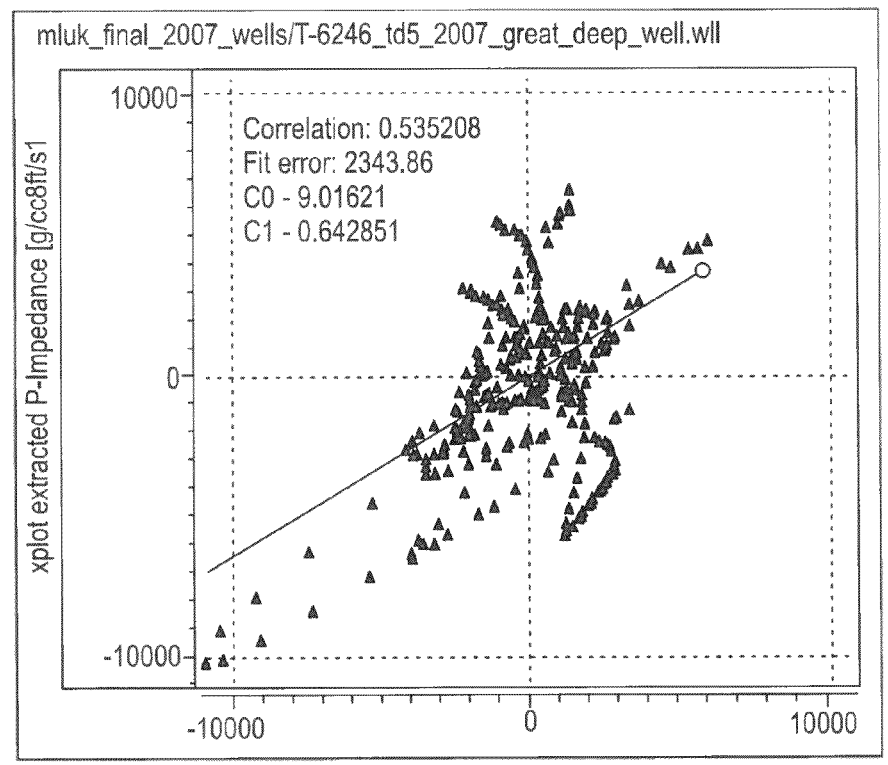
Figure 11C:
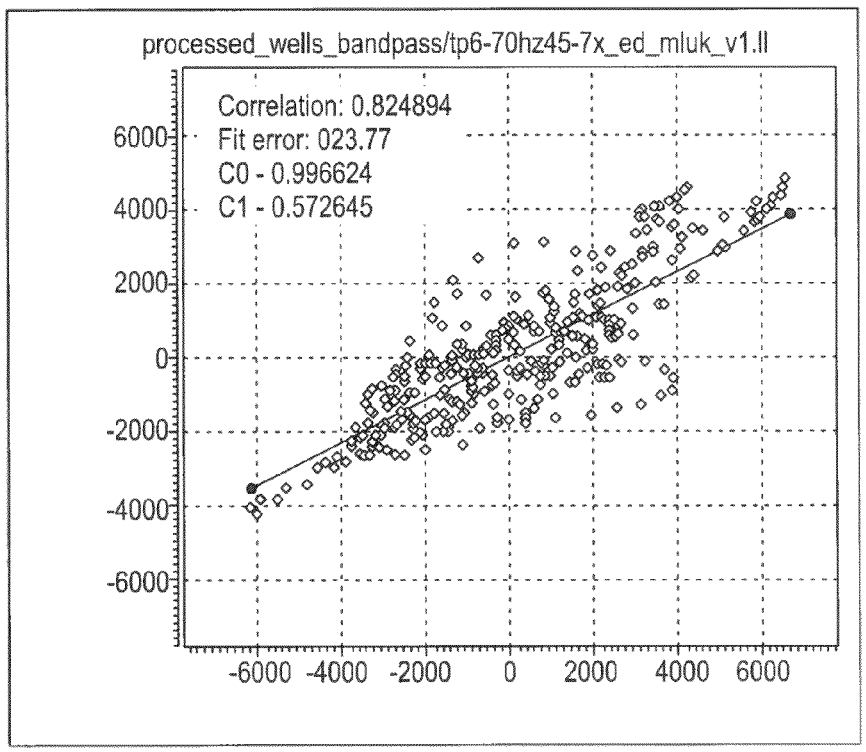
Figure 11D:
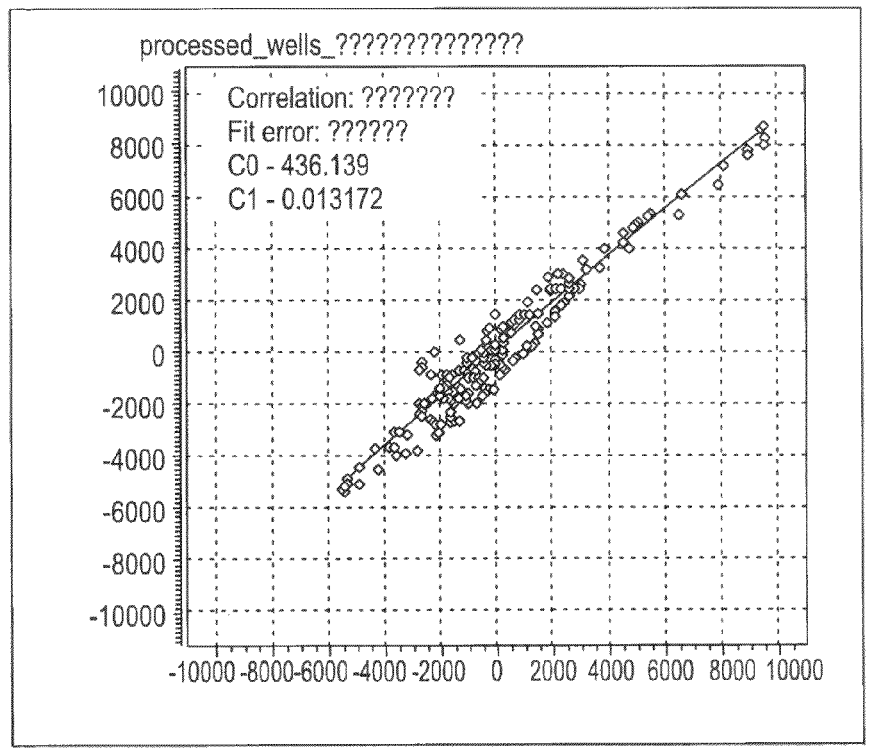

FIGS. 11A to 11D display various output plots of seismic impedance versus well impedance, according to various scenarios. For example, FIG. 11A shows a plot where a correlation of seismic impedance with well impedance is very weak as shown by the weak $R^2$ equal to about 0.2 in the linear regression. This seismic impedance data is clearly not suitable for use in the soft-data debiasing method discussed in the above paragraphs. FIG. 11B shows a plot where a correlation of seismic impedance with well impedance is better than in FIG. 11A as shown by the weak $R^2$ equal to about 0.28 in the linear regression. This impedance data may be considered also not suitable for a soft-data debiasing process as discussed in the above paragraphs but in some circumstances can be used where this is the best available seismic data. FIG. 11C shows a plot where a correlation of seismic impedance with well impedance is better than in FIG. 11B as shown by the $R^2$ equal to about 0.63 in the linear regression. This impedance data may be considered suitable for a soft-data debiasing process as discussed in the above paragraphs. FIG. 11D shows a plot where a correlation of seismic impedance with well impedance is even better than in FIG. 11C as shown by the $R^2$ equal to about 0.9 in the linear regression. This impedance data is clearly suitable for a soft-data debiasing process as discussed in the above paragraphs. On the other hand, if the correlation is too high, such as close to 0.95 or higher, this may raise a red flag that the seismic data product may be a model-based impedance inversion product in which values have been directly set at the well control. If values have been directly set then the inversion product is not suitable for soft-data debiasing. Therefore, this correlation procedure can act as a quality control procedure to determine the quality and usefulness of the seismic soft-data.

FIG. 12 depicts another graphical user interface (GUI) for inputting various parameters such as a number N of sets per region, i.e., sub-sets (sub-set0, sub-set1, . . . , sub-setN), to calculate the distribution, according to an embodiment of the present invention. Graphical interface 200 includes field 201 for inputting a distribution minimum (e.g., 0.0) and field 202 for inputting a distribution maximum (e.g., 0.4). The GUI 200 further includes a field 203 for inputting a number of bootstrap sets per region (e.g., 100) and field 204 for inputting a seed value for the bootstrap process. GUI further includes field 205 for inputting a statistical significance level minimum and a field 206 for inputting a statistical significance level maximum. GUI 200 further includes buttons 207A-207F for selecting a type of statistics that will be used for the ranking process such as mean, variance, P10, P90, P10 and mean, and P90 and mean. For example, mean can be selected for volumetric uncertainty in high natural gas NTG fields, variance can be selected for heterogeneity uncertainty, P10 or P90 can be selected for thief zones or barriers, P10 and mean or P90 and mean can be used for volumetric uncertainty in low NTG fields. GUI 200 also includes field 208 for specifying the ensemble averaging percentage to specify bootstrap sets ranked near each other within the ensemble averaging percentage value that will be averaged together. GUI 200 further includes field 209 for specifying a name for the output file such as "SoftDataDebiasing", a field 210 for specifying a name for a sub-file or sheet prefix name such as "Bootstrap-Statitistics," and a field 211 for inputting a distribution name such as "Distribution". GUI 200 further includes button "Apply" 212 to apply and compute the uncertainty with bootstrap statistics using the input parameters.

Figure 13:
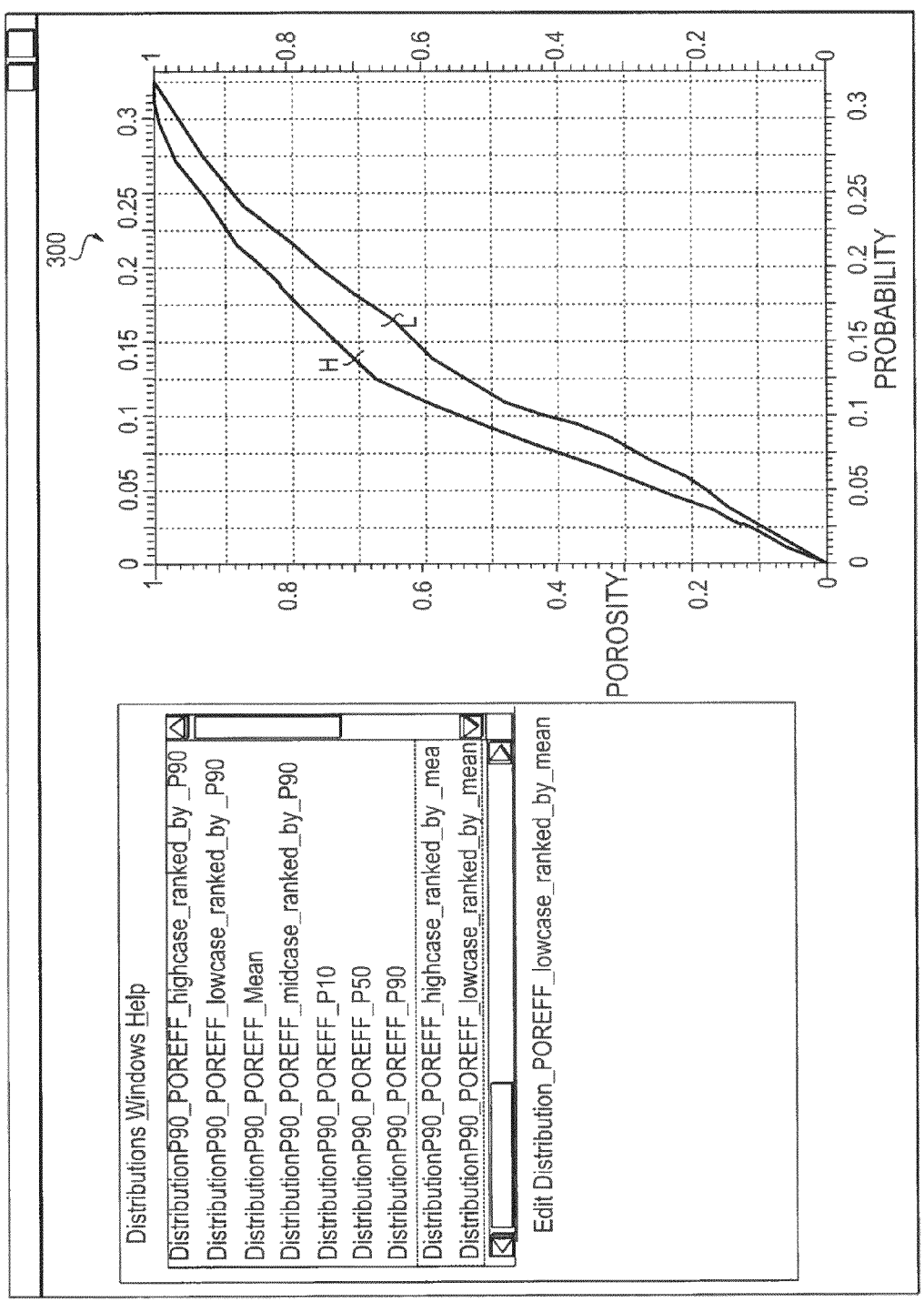
FIG. 13 is a plot of the results of a probability distribution function for a porosity ranked by mean, according to an embodiment of the present invention.

FIG. 13 is plot of the results of the probability density function (PDF) 300 for a porosity ranked by mean, according to an embodiment of the present invention. The horizontal axis (X-axis) corresponds to the cumulative probability and the vertical axis (Y-axis) corresponds to the porosity value of the distribution. Therefore, as shown in FIG. 13, the value of the distribution is plotted as a function of cumulative probability for a high case 'H' and a low case 'L'. For example the H case has higher porosity and the L case has lower porosity. For example, for the median of the distribution where the cumulative probability is equal to approximately 0.1, a vertical line intersects the L curve at a value of 0.4 and intersects the H curve at a value of 0.55. Therefore, the L curve has a lower mean than the H curve. The L and H reservoir property (e.g., porosity) distributions can be used to build two different model scenarios to capture property (e.g., porosity) uncertainty and thus define reservoir economics (e.g., determine oil or gas reservoir resources).

In this example, mean is used to determine the ranking of the alternative distributions. The mean of the distribution reflects the volume of a reservoir or volumetric uncertainty. The reservoir depends on the mean of the components that go into oil in place. However, other statistical parameters can also be used, such as P10 or P90, depending on the characteristic of the oil or natural gas field to be evaluated. Standard deviation or variance can also be used in evaluating the volume of recoverable reservoir. For example, when oil and water flow through a rock formation, the standard deviation of rock formation porosity and permeability indicates a spread of the variability that creates heterogeneity in the rock formation and consequently may lower the recovery factor.

In some embodiments, programs for performing methods in accordance with embodiments of the invention can be embodied as program products in a computer such as a personal computer or server or in a distributed computing environment comprising a plurality of computers. Therefore, the term processor must be understood as encompassing both one or more processors. The method may be implemented on the one or more processors. The one or more processors can be within one computer or distributed in a plurality of computers. The computer may include, for example, a desktop computer, a laptop computer, a handheld computing device such as a PDA, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) can be designed to implement the method or methods of the present invention.

Although the various steps of the method are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method, implemented on a computer, for determining the uncertainty of soft-data debiasing of property distributions of spatially correlated reservoir data, comprising:
   inputting, into the computer, soft-data at a plurality of spatial locations on a grid and hard-data at a plurality of location along well paths that intersect the grid, wherein each location of the hard-data is collocated with soft-data values of one or more types;
   calculating, using the computer, a variogram of the hard-data and creating subsets of independent hard-data using the variogram and the soft-data values that are collocated with each of the hard-data location;
   applying, using the computer, a bootstrap process on each of the plurality of subsets of independent hard-data to obtain a plurality of bootstrap data sets from each of the plurality of subsets of independent hard-data;
   calculating soft-data debiased histograms for each of the obtained plurality of bootstrap data sets using a binary decision tree and the collocated soft-data;
   characterizing the uncertainty of the soft-data debiased histograms; and
   using the soft-data debiased histograms and the uncertainty for a quantitative oil in place assessment.

2. The method according to claim 1, wherein the soft data comprises seismic data, seismic attributes, or seismic inversion products, or any combination thereof, and the hard data comprises down-hole well logs of petrophysical properties.

3. The method according to claim 1, wherein the soft-data, the hard-data, or both are weighted using weight factors to form a linear combination of soft-data or linear combination of hard-data or both.

4. The method according to claim 3, wherein the weight factors are adjusted so that the correlation between the weighted hard-data and the collocated weighted soft-data is maximized so as to achieve a more linear relationship between the weighted hard-data and the weighted soft-data.

5. The method according to claim 1, further comprising verifying that seismic impedance in the soft-data correlates with collocated well log impedance in the hard-data.

6. The method according to claim 1, wherein calculating the soft-data debiased histograms comprises:
   inputting, into the computer, minimum and maximum confidence levels;
   selecting randomly, using the computer, a confidence level between the minimum and maximum confidence levels;
   sorting, using the computer, all data by soft-data value and putting all the data in one bin;
   determining, using the computer, a first split soft-data value that maximizes a difference in hard-data property values in the bin above the first soft-data split value and below the first soft-data split value;
   if the difference in hard-data property values is statistically significant at the selected confidence level accept the first split soft-data value;
   determining a second split soft-data value for a first sub-bin above the first split soft-data value that maximizes a difference in hard-data property values in a sub-bin within the first sub-bin above the second split soft-data value and below the second split soft-data value; and
   determining a third split soft-data value for a second sub-bin below the first split soft-data value that maximizes a difference in hard-data property values in a sub-bin within the second sub-bin above the third split soft-data value and below the third split soft-data value; and
   repeating the determining recursively until reaching the selected confidence level to form a binary tree decision tree of classification of bins.

7. The method according to claim 6, further comprising:
   applying the binary decision tree classification of bins to each cell in a plurality of cells on the grid to predict a probability distribution of hard-data in each cell to obtain probability distributions of hard-data associated with the plurality of cells; and
   calculating the debiased soft-data histogram by a cell volume-weighted average of the probability distributions in each cell.

8. The method according to claim 1, wherein applying the variogram comprises selecting a gamma value of the variogram according to the sample petrophysical data.

9. The method according to claim 8, wherein selecting the gamma value comprises selecting a gamma value in a range between 0.3 and 1.

10. The method according to claim 9, wherein selecting the gamma value comprises selecting a gamma value greater than 0.5.

11. The method according to claim 1, wherein applying the bootstrap process comprises applying a resampling bootstrap process on each of the plurality of subsets of data.

12. The method according to claim 1, further comprising:
    selecting a statistical parameter for ranking statistical distributions;
    ranking the histograms by using a selected statistical parameter to obtain ranked soft-data debiased histograms; and
    characterizing the uncertainty of the soft-data debiased histograms based on the ranked soft-data debiased histograms.

13. The method according to claim 12, wherein ranking the data distributions by using the selected statistical parameter comprises applying a vector-scalar transform to the soft-data histograms to obtain scalar values, each scalar value being associated with a histogram, and ranking the soft-data histograms according to the obtained scalar values.

14. The method according to claim 13, wherein applying the vector-scalar transform comprises applying a mean function or a standard deviation function.

15. The method according to claim 14, further comprising applying an ensemble averaging to a portion of the histograms that are ranked within a desired ranking ensemble averaging percentage.

16. A computer program product comprising a computer readable medium having instructions stored thereon when executed by a computer performs the method recited in claim 1.

17. A computer system for determining the uncertainty of soft-data debiasing of property distributions of spatially correlated reservoir data, the system comprising:
a storage device configured to store soft-data at a plurality of spatial locations on a grid and hard-data along well paths that intersect the grid;
a processor configured to output a graphical user interface, the graphical user interface comprising a plurality of fields for inputting parameters, wherein the processor is configured to:
calculate a variogram of the hard-data and creating subsets of independent hard-data using a variogram;
apply a bootstrap process on each of the plurality of subsets of independent hard-data to obtain a plurality of bootstrap data sets from each of the plurality of subsets of independent hard-data;
calculate soft-data debiased histograms for each of the obtained plurality of bootstrap data sets using a binary decision tree;
characterize the uncertainty of the soft-data debiased histograms; and
use the soft-data debiased histograms and the uncertainty for a quantitative oil in place assessment.

18. The system according to claim 17, wherein the soft data comprises seismic data, seismic attributes, or seismic inversion products, or any combination thereof, and the hard data comprises down-hole well logs of petrophysical properties.

19. The system according to claim 17, wherein the soft-data, the hard-data, or both are weighted using weight factors to form a linear combination of soft-data or linear combination of hard-data or both.

20. The system according to claim 19, wherein the weight factors are adjusted so that the correlation between the weighted hard-data and the collocated weighted soft-data is maximized so as to achieve a more linear relationship between the weighted hard-data and the weighted soft-data.

21. The system according to claim 17, wherein the processor is further configured to verify that seismic impedance in the soft-data correlates with collocated well log impedance in the hard-data.

22. The system according to claim 17, wherein the processor is further configured to:
select randomly a confidence level between an minimum and maximum confidence levels input through the graphical user interface;
sort all data by soft-data value and putting all the data in one bin;
determine a first split soft-data value that maximizes a difference in hard-data property values in the bin above the first soft-data split value and below the first soft-data split value;
if the difference in hard-data property values is statistically significant at the selected confidence level accept the first split soft-data value;
determine a second split soft-data value for a first sub-bin above the first split soft-data value that maximizes a difference in hard-data property values in a sub-bin within the first sub-bin above the second split soft-data value and below the second split soft-data value; and
determine a third split soft-data value for a second sub-bin below the first split soft-data value that maximizes a difference in hard-data property values in a sub-bin within the second sub-bin above the third split soft-data value and below the third split soft-data value;
repeat the determining recursively until reaching the selected confidence level to form a binary tree decision tree of classification of bins.

23. The system according to claim 22, wherein the processor is configured to:
apply the binary decision tree classification of bins to each cell in a plurality of cells on a grid to predict a probability distribution of hard-data in each cell to obtain probability distributions of hard-data associated with the plurality of cells; and
calculate the soft-data debiased histogram using a cell volume-weighted average of the probability distributions in each cell.

24. The system according to claim 17, wherein the processor is configured to apply the bootstrap process using resampling bootstrap process on each of the plurality of subsets of data.

25. The system according to claim 17, wherein the processor is configured to:
rank the histograms by using a selected statistical parameter to obtain ranked soft-data debiased histograms; and
characterize the uncertainty of the soft-data debiased histograms based on the ranked soft-data debiased histograms.

26. The system according to claim 25, wherein, in order to rank the data distributions, the processor is configured to apply a vector-scalar transform to the soft-data histograms to obtain scalar values, each scalar value being associated with a histogram, and rank the soft-data histograms according to the obtained scalar values.

27. The system according to claim 26, wherein the vector-scalar transform comprises a mean function or a standard deviation function.

28. The system according to claim 27, wherein the processor is further configured to apply an ensemble averaging to a portion of the histograms that are ranked within a desired ranking ensemble averaging percentage.

* * * * *